United States Patent
Toge et al.

(10) Patent No.: US 11,795,251 B2
(45) Date of Patent: Oct. 24, 2023

(54) ACRYLIC RUBBER AND CROSSLINKABLE COMPOSITION THEREOF

(71) Applicant: UNIMATEC CO., LTD., Tokyo (JP)

(72) Inventors: Daichi Toge, Ibaraki (JP); Iwao Moriyama, Ibaraki (JP)

(73) Assignee: UNIMATEC CO., LTD., Tokyo (JP)

( * ) Notice: Subject to any disclaimer, the term of this patent is extended or adjusted under 35 U.S.C. 154(b) by 272 days.

(21) Appl. No.: 17/044,548

(22) PCT Filed: May 16, 2019

(86) PCT No.: PCT/JP2019/019561
§ 371 (c)(1),
(2) Date: Oct. 1, 2020

(87) PCT Pub. No.: WO2019/225481
PCT Pub. Date: Nov. 28, 2019

(65) Prior Publication Data
US 2021/0155729 A1 May 27, 2021

(30) Foreign Application Priority Data
May 24, 2018 (JP) ................................ 2018-099671

(51) Int. Cl.
| | |
|---|---|
| *C08F 220/18* | (2006.01) |
| *C08F 220/28* | (2006.01) |
| *C08F 220/22* | (2006.01) |
| *C08K 3/06* | (2006.01) |
| *C08K 5/3492* | (2006.01) |
| *C08K 5/36* | (2006.01) |

(52) U.S. Cl.
CPC ...... *C08F 220/1804* (2020.02); *C08F 220/22* (2013.01); *C08F 220/281* (2020.02); *C08F 220/282* (2020.02); *C08K 3/06* (2013.01); *C08K 5/3492* (2013.01); *C08K 5/36* (2013.01); *C08F 2800/20* (2013.01)

(58) Field of Classification Search
CPC ........... C08F 220/1804; C08F 220/281; C08F 220/282; C08F 220/286; C08F 2800/20; C08K 3/06
See application file for complete search history.

(56) References Cited

U.S. PATENT DOCUMENTS

| | | | | |
|---|---|---|---|---|
| 4,942,906 | A * | 7/1990 | Igarashi | F02M 37/0017 |
| | | | | 285/236 |
| 5,216,101 | A * | 6/1993 | Kawanaka | C08F 220/12 |
| | | | | 526/320 |
| 5,280,080 | A | 1/1994 | Kawanaka et al. | |
| 2011/0040043 | A1 | 2/2011 | Ito et al. | |
| 2018/0340098 | A1* | 11/2018 | Tanabe | C09J 133/06 |
| 2019/0359801 | A1* | 11/2019 | Saito | C08K 5/3465 |

FOREIGN PATENT DOCUMENTS

| | | |
|---|---|---|
| EP | 2 177 564 | 4/2010 |
| JP | S59-113010 A | 6/1984 |
| JP | H05-262830 A | 10/1993 |
| JP | H06-145257 A | 5/1994 |
| JP | H09-132605 A | 5/1997 |
| JP | 2007-186631 A | 7/2007 |
| JP | 2009-40922 A | 2/2009 |
| JP | 2010-235955 A | 10/2010 |

OTHER PUBLICATIONS

International Search Report, WIPO, Application No. PCT/JP2019/019561, dated Aug. 20, 2019, English translation.
International Preliminary Report on Patentability, WIPO, Application No. PCT/JP2019/019561, dated Nov. 24, 2020, English translation.
European Search Report issued with respect to European Application No. 19 807 872.7, dated Jan. 27, 2022.

* cited by examiner

*Primary Examiner* — Satya B Sastri
(74) *Attorney, Agent, or Firm* — GREENBLUM & BERNSTEIN, P.L.C.

(57) ABSTRACT

An acrylic rubber that is a copolymer in which 1 to 4 wt. % of a reactive halogen group-containing vinyl monomer is copolymerized as a crosslinkable comonomer, wherein 45 to 65 wt. % of n-butyl acrylate, 10 to 35 wt. % of 2-methoxyethyl acrylate and 8 to 30 wt. % of ethoxyethoxyethyl acrylate are copolymerized in 100 wt. % of comonomers other than the crosslinkable comonomer. This ethoxyethoxyethyl acrylate-copolymerized acrylic rubber can suppress the reduction of oil resistance while improving cold resistance represented by a TR-10 value, and by compounding it with a vulcanizing agent corresponding to the crosslinkable group thereof, a crosslinkable composition is formed.

6 Claims, No Drawings

ACRYLIC RUBBER AND CROSSLINKABLE COMPOSITION THEREOF

TECHNICAL FIELD

The present invention relates to an acrylic rubber and a crosslinkable composition thereof. More particularly, the present invention relates to an acrylic rubber that can suppress the reduction of oil resistance while improving cold resistance and a crosslinkable composition thereof.

BACKGROUND ART

Current super cold-resistant grade acrylic rubber has a cold resistance (TR10 value) of about −40° C. When acrylic rubber is used as an oil seal molding material, the use thereof in extremely cold areas is difficult in view of cold resistance. In recent years, there has been an increasing demand for use of automobiles in extremely cold areas, and acrylic rubber as an oil seal molding material that can be used also in extremely cold areas has been required.

It is considered that the cold resistance of acrylic rubber can be improved by introducing an acrylic acid alkyl ester monomer that has a longer chain length on the alkyl group side than conventional ones. However, when the alkyl chain is simply extended, oil swelling resistance, which is an important characteristic as an oil seal molding material, overly increases, and such a material cannot be used as a practical molding material.

Patent Document 1 discloses an acrylic rubber composition compounded with silica that can improve its extrudability and roll moldability without reducing its heat resistance. Patent Document 1 indicates that an alkyl (meth)acrylate-alkoxyalkyl (meth)acrylate copolymer or the like is used as the acrylic rubber; that the alkyl group of the alkyl (meth)acrylate with a longer chain length is advantageous in terms of cold resistance, but is disadvantageous in terms of oil resistance; that these characteristics are reversed when the chain length becomes shorter; and that the alkoxyalkyl acrylate has an ether bond in a side chain, and thus has excellent cold resistance and oil resistance. Patent Document 1 also indicates that, from the viewpoint of the balance between cold resistance and oil resistance, the alkyl acrylate is preferably ethyl acrylate and n-butyl acrylate, and the alkoxyalkyl acrylate is preferably 2-methoxyethyl acrylate and 2-ethoxyethyl acrylate.

Further, Patent Document 2 discloses a peroxide crosslinkable acrylic rubber composition that has a high vulcanizing rate and can provide a vulcanizate having excellent normal state physical properties and compression set characteristics, wherein copolymer rubber of alkyl (meth)acrylate and (meth)acrylate having an ether group forming a side chain is used as the acrylic rubber.

Patent Document 2 refers to, as examples of the (meth)acrylate having a side chain ether group, alkoxyalkyl esters and aryloxyalkyl esters such as methoxymethyl, methoxyethyl, ethoxyethyl, butoxyethyl, ethoxypropyl and phenoxyethyl of (meth)acrylic acid, as well as methoxy triethylene glycol esters (Example 2)
$MeO(CH_2CH_2O)_3COCH=CH_2$
phenoxydiethylene glycol ester
$PhO(CH_2CH_2O)_2COCH=CH_2$
phenoxypolyethylene glycol
$PhO(CH_2CH_2O)_nCOCH=CH_2$ of (meth)acrylic acid.

However, when a methoxy triethylene glycol ester (methoxyethoxyethoxyethyl acrylate [MTGA]) is used, the tensile strength and elongation at break are deteriorated compared with the Examples, as shown in the results of Comparative Examples 4 and 5 described later. Further, there are problems that the value of Mooney viscosity $ML_{1+4}$ (100° C.) is high, and that moldability is not good.

Further, Patent Document 3 indicates that when a blend of terpolymer acrylic rubber of n-butyl acrylate, 2-methoxyethyl acrylate and vinyl monochloroacetate, and quaternary copolymer acrylic rubber obtained by further subjecting the terpolymer rubber to a copolymerization reaction with $CH_2=CHCOOC_2H_4O(COC_5H_{10}O)_mCOCH_3$ (m: 2.11 on average) is vulcanized, a vulcanizate having excellent cold resistance (i.e., TR-10 value: −44° C.) is provided; and that the TR-10 value of a vulcanizate of the terpolymer acrylic rubber alone is merely −40° C. Moreover, when the compression set value of the blend having a TR-10 value of −44° C. is measured, a value of 59% is obtained, as shown in a Reference Example described later.

PRIOR ART DOCUMENTS

Patent Documents

Patent Document 1: JP-A-2009-40922
Patent Document 2: JP-A-2007-186631
Patent Document 3: JP-A-6-145257

OUTLINE OF THE INVENTION

Problem to be Solved by the Invention

An object of the present invention is to provide an acrylic rubber that can suppress the reduction of oil resistance while improving cold resistance represented by a TR-10 value, and to also provide a crosslinkable composition thereof.

Means for Solving the Problem

The above object of the present invention can be achieved by an acrylic rubber that is a copolymer in which 1 to 4 wt. % of a reactive halogen group-containing vinyl monomer is copolymerized as a crosslinkable comonomer, wherein 45 to 65 wt. % of n-butyl acrylate, 10 to 35 wt. % of 2-methoxyethyl acrylate, and 8 to 30 wt. % of ethoxyethoxyethyl acrylate are copolymerized in 100 wt. % of comonomers other than the crosslinkable comonomer.

This ethoxyethoxyethyl acrylate-copolymerized acrylic rubber is compounded with a vulcanizing agent corresponding to the crosslinkable group thereof, thereby forming a crosslinkable composition.

Effect of the Invention

In acrylic rubber obtained by copolymerizing ethoxyethoxyethyl acrylate, which is not exemplified in Patent Document 2, in a conventionally known acrylic copolymer containing alkyl acrylate, alkoxyalkyl acrylate and a crosslinkable group (reactive halogen group)-containing vinyl monomer, the aggregation of acrylic copolymer molecular chains itself in a low temperature region is inhibited and Tg decreases due to the introduction of ethoxyethoxyethyl acrylate with a long side chain, thereby improving cold resistance.

Moreover, ethoxyethoxyethyl acrylate has a higher polarity than that of alkyl acrylates with a longer side chain such as octyl acrylate, and thus can suppress the reduction of oil resistance while improving cold resistance.

This acrylic rubber can be crosslinked with a vulcanizing agent that corresponds to the reactive halogen group, which is a crosslinkable group introduced into the rubber. The vulcanizate obtained from this crosslinkable composition reduces the TR-10 value and improves cold resistance.

EMBODIMENTS FOR CARRYING OUT THE INVENTION

The acrylic rubber according to the present invention comprises an acrylic copolymer comprising n-butyl acrylate, 2-methoxyethyl acrylate, and a reactive halogen group-containing vinyl monomer, wherein ethoxyethoxyethyl acrylate is further copolymerized.

Ethoxyethoxyethyl acrylate $C_2H_5O(CH_2CH_2O)CH_2CH_2OCOCH=CH_2$ is used at a ratio of about 8 to 30 wt. %, preferably about 10 to 27 wt. %, in 100 wt. % of comonomers other than the crosslinkable comonomer of the resulting acrylic copolymer. If the copolymerization ratio of ethoxyethoxyethyl acrylate is less than this range, the desired effect of improving cold resistance cannot be obtained. In contrast, if ethoxyethoxyethyl acrylate is used at a ratio larger than this range, the oil resistance, tensile strength, and compression set characteristics are deteriorated.

n-Butyl acrylate, which is used as a main component of the acrylic copolymer, is used at a ratio of about 45 to 65 wt. %, preferably about 55 to 62 wt. %, in 100 wt. % of comonomers other than the crosslinkable comonomer of the copolymer.

Moreover, 2-methoxyethyl acrylate is used at a ratio of about 10 to 35 wt. %, preferably about 12 to 33 wt. %, in 100 wt. % of comonomers other than the crosslinkable comonomer of the copolymer. If 2-methoxyethyl acrylate is used at a ratio larger than this range, the desired effect of improving cold resistance cannot be expected. In contrast, if 2-methoxyethyl acrylate is used at a ratio less than this range, the elongation at break is deteriorated. In addition, if higher alkyl acrylate is used in place of 2-methoxyethyl acrylate, the oil resistance is deteriorated, as shown in Comparative Examples 6 and 7 described later.

In the acrylic copolymer, other vinyl monomers or olefin monomers, such as styrene, vinyl toluene, α-methylstyrene, vinyl naphthalene, acrylonitrile, methacrylonitrile, acrylamide, vinyl acetate, cyclohexyl acrylate and benzyl acrylate, can also be copolymerized within a range that does not damage the characteristics thereof (generally about 2 wt. % or less).

The reactive halogen group-containing vinyl monomer, which is copolymerized in the acrylic copolymer comprising these components as main components, is used at a ratio of about 1 to 4 wt. %, preferably about 1 to 1.5 wt. %, in the copolymer. If the reactive halogen group-containing vinyl monomer is used at a ratio less than this range, the tensile strength and compression set characteristics are deteriorated. In contrast, if the reactive halogen group-containing vinyl monomer is used at a ratio larger than this range, the elongation at break is reduced.

Examples of the reactive halogen group-containing vinyl monomer include chloroethyl vinyl ether, chloroethyl acrylate, vinyl benzyl chloride, vinyl chloroacetate, allyl chloroacetate, chloromethyl styrene, and the like.

The copolymerization reaction is carried out in the presence of a common radical initiator by any polymerization method such as emulsion polymerization, suspension polymerization, solution polymerization and block polymerization. The radical initiator usable herein is a redox radical initiator using such as tertiary butyl hydroperoxide and sodium formaldehyde sulfoxylate in combination, ammonium persulfate and sodium hydrogen sulfite in combination; preferably a redox radical initiator using tertiary butyl hydroperoxide and sodium formaldehyde sulfoxylate in combination. In the case of emulsion polymerization, which is a preferable polymerization method, the polymerization reaction is carried out in the presence of various surfactants. A chain transfer agent can be used in the polymerization reaction.

Examples of the surfactant include sodium lauryl sulfate, sodium oleate, sodium alkyl sulfonate, and sodium dodecylbenzene sulfonate; sodium polyoxyethylene alkyl ether sulfate and the like, or potassium salts or calcium salts corresponding thereto; polyoxyethylene lauryl ether, polyethylene glycol fatty acid ester, sodium polyoxyethylene alkyl aryl, and the like; preferably sodium lauryl sulfate and polyoxyethylene lauryl ether. These are used individually or in combination.

Usable examples of the chain transfer agent include n-dodecyl mercaptan, octyl mercaptan, α-methylstyrene dimer, 1,4-terpinolene, and the like; preferably n-dodecyl mercaptan. If a larger amount of the chain transfer agent is added, the copolymer to be obtained has a lower molecular weight, and the strength at break and Mooney viscosity $ML_{1+4}$ (100° C.) are reduced. The chain transfer agent is used in an amount of about 0.001 to 0.05 parts by weight, preferably about 0.0035 to 0.01 parts by weight, based on 100 parts by weight of the total amount of the charged monomers.

The polymerization reaction is carried out at a temperature of about −10 to 100° C., preferably about 2 to 80° C., by any method such as a batch method, or a continuous or intermittent addition method. Separation of the copolymer after the completion of the reaction is carried out by a different method depending on the polymerization method. For example, in the case of an emulsion polymerization method or a suspension polymerization method, the copolymer is separated by adding a coagulant such as an acid or a polyvalent metal salt to the reaction mixture solution. The separated copolymer is subjected to washing and drying processes.

The acrylic copolymer rubber to be obtained has a Mooney viscosity $ML_{1+4}$ (100° C.) of 5 or more, preferably 5 to 100. Acrylic copolymer rubber having a Mooney viscosity of less than this range is inferior in terms of tensile strength as rubber. In contrast, acrylic copolymer rubber having a Mooney viscosity that is too high has inferior processability.

The obtained crosslinkable group-containing acrylic copolymer, which comprises a reactive halogen group as a crosslinkable group, is subjected to vulcanization molding using, as a vulcanizing agent, sulfur (donator), a triazine compound, and the like that is a vulcanizing agent that reacts with the reactive halogen group. Usable examples of sulfur include powder sulfur, precipitated sulfur, colloid sulfur, insoluble sulfur, high dispersion sulfur, and the like. Sulfur (donator) is preferably used when excellent normal state physical properties such as tensile strength are required, and a triazine compound is preferably is used when excellent compression set characteristics are required. As the triazine compound, for example, 2,4,6-trimercapto-s-triazine is used at a ratio of about 0.1 to 10 parts by weight, preferably about 0.2 to 2 parts by weight, based on 100 parts by weight of the acrylic copolymer. Sulfur (donator) is also used at the same ratio.

These vulcanizing agents are preferably used in combination with a vulcanization accelerator. Usable vulcanization accelerators include metal soaps such as sodium stearate and potassium stearate, and metal oxides such as zinc oxide, magnesium oxide and lead oxide.

In the case of the triazine compound vulcanizing agent, usable examples of the vulcanization accelerator include dithiocarbamic acid derivative metal salts such as zinc dimethyldithiocarbamate, copper dimethyldithiocarbamate, lead dimethyldithiocarbamate, zinc diethyldithiocarbamate, zinc di-n-butyldithiocarbamate, zinc di-n-hexyldithiocarbamate, zinc di-n-octyldithiocarbamate, zinc di-n-decyldithiocarbamate, zinc di-n-dodecyldithiocarbamate, zinc methylbenzyldithiocarbamate, zinc dibenzyldithiocarbamate, zinc methylcyclohexyldithiocarbamate, zinc dicyclohexyldithiocarbamate, cadmium dimethyldithiocarbamate, cadmium diethyldithiocarbamate, bismuth dimethyldithiocarbamate, bismuth diethyldithiocarbamate, iron dimethyldithiocarbamate, iron diethyldithiocarbamate, tellurium dimethyldithiocarbamate, tellurium diethyldithiocarbamate, selenium dimethyldithiocarbamate, selenium diethyldithiocarbamate and zinc N-pentamethylenedithiocarbamate.

Alternatively, thiuram sulfide compounds such as tetramethylthiuram monosulfide, tetraethylthiuram monosulfide, tetra-n-butylthiuram monosulfide, tetramethylthiuram disulfide, tetraethylthiuram disulfide, tetra-n-butylthiuram disulfide, tetra-n-hexylthiuram disulfide, tetra-n-octylthiuram disulfide, tetra-n-decylthiuram disulfide, tetra-n-dodecylthiuram disulfide, N,N'-dimethyl-N,N'-dibenzylthiuram disulfide, tetrabenzylthiuram disulfide, tetracyclohexylthiuram disulfide, N,N'-dimethyl-N,N'-dicyclohexylthiuram disulfide, and di(pentamethylene)thiuram disulfide, are also used as vulcanization accelerators for the triazine compound vulcanizing agent.

After a reinforcing agent, a filler, a stabilizer, a processing aid, etc. are added to the acrylic copolymer using a closed type kneading machine, a vulcanizing agent and a vulcanization accelerator are added using an open roll to form a crosslinkable composition. Then, press vulcanization is performed at about 150 to 200° C. for about 1 to 30 minutes, optionally followed by oven vulcanization (secondary vulcanization) at about 150 to 180° C. for about 1 to 16 hours. Molding into a hose-like shape and vulcanization thereof are performed by injection molding or extrusion molding.

EXAMPLES

The following describes the present invention with reference to Examples.

Examples 1 to 6 and Reference Example (1) In a separable flask equipped with a thermometer, a stirrer, a nitrogen gas inlet tube, and a Dimroth condenser tube, the following components were charged:

| | |
|---|---|
| Water | 187 parts by weight |
| Sodium lauryl sulfate | 1.6 parts by weight |
| Polyoxyethylene lauryl ether | 1.6 parts by weight |
| n-Dodecyl mercaptan (chain transfer agent) | 0.0035 parts by weight |
| Charged monomer mixture | 100 parts by weight |

After nitrogen gas substitution was carried out to sufficiently remove oxygen from the system, a redox initiator comprising:

| | |
|---|---|
| Sodium formaldehyde sulfoxylate (Rongalite, produced by Wako Pure Chemical Industries, Ltd.) | 0.011 parts by weight |
| Tertiary butyl hydroperoxide (Perbutyl H, produced by NOF Corporation) | 0.0063 parts by weight | was added to initiate the polymerization reaction under room temperature conditions, and the reaction was continued until the polymerization conversion rate become 90% or more. The formed aqueous latex was coagulated with a 10 wt. % sodium sulfate aqueous solution, washed with water, and dried, thereby obtaining an acrylic rubber.

Table 1 below shows the amount of the charged monomer mixture used (parts by weight) and the amount of the produced acrylic rubber (parts by weight).

TABLE 1

| Charged monomer mixture | Example | | | | | |
|---|---|---|---|---|---|---|
| | 1 | 2 | 3 | 4 | 5 | 6 |
| n-BA | 55.0 | 55.0 | 55.0 | 54.7 | 54.4 | 60.0 |
| 2-MEA | 22.5 | 32.5 | 17.5 | 22.4 | 22.3 | 12.5 |
| EEEA | 19.0 | 9.0 | 24.0 | 18.9 | 18.8 | 24.0 |
| St | 1 | 1 | 1 | 1 | 1 | 1 |
| Cl-VAc | 2.5 | 2.5 | 2.5 | 3.0 | 3.5 | 2.5 |
| Amount of the produced acrylic rubber | 94.8 | 94.3 | 94.8 | 94.1 | 93.7 | 94.8 |

Notes:
n-BA: n-butyl acrylate
2-MEA: 2-methoxyethyl acrylate
EEEA: ethoxyethoxyethyl acrylate
St: styrene
Cl-VAc: vinyl monochloroacetate Table 2 shows the copolymerization ratio, Mooney viscosity $ML_{1+4}$ (100° C.), and Tg value of the obtained acrylic rubbers. The total amount of the monomer components, i.e., n-butyl acrylate, 2-methoxyethyl acrylate, and ethoxyethoxyethyl acrylate, is shown as 100 wt. % or 100 mol %.

TABLE 2

| Copolymerization ratio as measured by $^1$H-NMR | | Example | | | | | |
|---|---|---|---|---|---|---|---|
| | | 1 | 2 | 3 | 4 | 5 | 6 |
| n-BA | wt. % | 57.3 | 57.3 | 56.8 | 55.7 | 56.1 | 61.2 |
| | mol % | 61.7 | 58.5 | 62.1 | 60.5 | 60.8 | 67.1 |
| 2-MEA | wt. % | 21.6 | 32.6 | 17.7 | 20.4 | 20.6 | 12.0 |
| | mol % | 22.8 | 33.3 | 19.2 | 21.8 | 22.0 | 12.9 |
| EEEA | wt. % | 21.1 | 10.1 | 25.1 | 23.9 | 23.4 | 26.8 |
| | mol % | 15.5 | 7.1 | 18.6 | 17.7 | 17.2 | 20.0 |

TABLE 2-continued

| Copolymerization ratio as measured by $^1$H-NMR | | Example | | | | | |
|---|---|---|---|---|---|---|---|
| | | 1 | 2 | 3 | 4 | 5 | 6 |
| Cl-Vac Notes) | wt. % | 1.26 | 1.09 | 1.22 | 1.36 | 1.43 | 1.22 |
| chlorine content | wt. % | 0.37 | 0.32 | 0.36 | 0.40 | 0.42 | 0.36 |
| Mooney viscosity $ML_{1+4}$ (100° C.) | (point) | 23 | 24 | 22 | 21 | 21 | 22 |
| Polymer Tg | (° C.) | −48.2 | −45.6 | −50.0 | −48.8 | −48.8 | −50.5 |

Notes:
Using a Total Organic Halogen Analyzer (Model TOX-2100, produced by Mitsubishi Chemical Analytech Co., Ltd.), the content of organic chlorine in the acrylic rubber was measured, and the copolymerization ratio of Cl-VAc was calculated from the obtained chlorine content.

(2) Using the acrylic rubber obtained in each Example, the following components were kneaded with an internal mixer.

| | |
|---|---|
| Acrylic rubber | 100 parts by weight |
| FEF carbon black | 60 parts by weight |
| Stearic acid | 1 part by weight |
| Antioxidant (Nocrac CD, produced by Ouchi Shinko Chemical Industrial Co., Ltd.; 4,4'-bis(α,α-dimethylbenzyl)diphenylamine) | 2 parts by weight |

Subsequently, the following components were added.

| | |
|---|---|
| Vulcanization accelerator (NS Soap, produced by Kao Corporation) | 3 parts by weight |
| Vulcanization accelerator (Nonsoul SK-1, produced by NOF Corporation) | 0.25 parts by weight |
| Vulcanizing agent (sulfur) | 0.3 parts by weight |

The resulting mixture was kneaded with an open roll to prepare a crosslinkable acrylic rubber composition. This composition was subjected to press vulcanization at 180° C. for 8 minutes, and then to oven vulcanization (secondary vulcanization) at 175° C. for 4 hours, thereby obtaining an acrylic rubber molded article.

The acrylic rubber molded article was measured for each of the following items.

Normal state physical properties: According to JIS K-6253 (2010) corresponding to ISO 7619-1: 2010, and JIS K-6251 (2010) corresponding to ISO 37: 2005

Oil swelling resistance test: According to JIS K-6258 (2010) corresponding to ISO 1817: 1999

IRM 903 oil was used, and volume changes ΔV100 after being immersed at 150° C. for 70 hours were measured TR test: According to JIS K-6261 (2006) corresponding to ISO 2921: 1997

TR-10 values were measured

Compression set: According to JIS K-6262 (2013) corresponding to ISO 815-1: 2008 and ISO 815-2: 2008, measurement values at 150° C. for 70 hours Table 3 below shows the above measurement results. The target for acceptance of each physical property value is as follows: tensile strength: 11.5 MPa or more, elongation at break: 130% or more, oil swelling resistance (ΔV100): 38% or less, TR-10: −42° C. or lower, and compression set: 35% or less. The Reference Example shows the measurement values (TR-10 value: according to JIS K-6301) of the blend (TR-10: −44° C.) of Example 4 of Patent Document 3.

TABLE 3

| Measurement item | | Example | | | | | | Reference Example |
|---|---|---|---|---|---|---|---|---|
| | | 1 | 2 | 3 | 4 | 5 | 6 | |
| Normal state physical properties | | | | | | | | |
| Hardness | (Duro A) | 64 | 60 | 62 | 61 | 60 | 62 | 71 |
| Mo 100 | (MPa) | 9.7 | 8.0 | 8.0 | 9.1 | 8.6 | 8.5 | 6.1 |
| Tensile strength | (MPa) | 12.1 | 12.1 | 11.6 | 12.3 | 12.5 | 11.9 | 7.3 |
| Elongation at break | (%) | 140 | 140 | 140 | 140 | 140 | 140 | 124 |
| ΔV100 | (%) | 33.7 | 29.9 | 36.2 | 33.9 | 34.1 | 37.1 | — |
| TR-10 | (° C.) | −44.3 | −42.1 | −45.5 | −45.3 | −45.0 | −46.0 | (−44) |
| Compression set | (%) | 33 | 32 | 35 | 29 | 28 | 35 | 59 |

Comparative Examples 1 to 9

(1) In the Examples, the amounts of the charged monomer mixtures used (parts by weight) were each changed as follows.

TABLE 4

| Charged monomer mixture | Comparative Example | | | | | | | | |
|---|---|---|---|---|---|---|---|---|---|
| | 1 | 2 | 3 | 4 | 5 | 6 | 7 | 8 | 9 |
| n-BA | 55 | 55 | 55 | 54.5 | 54.5 | 55 | 55 | 55 | 55.8 |
| 2-MEA | 12.5 | 2.5 | 36.5 | 22.5 | 18.0 | 12.5 | 21.5 | 41.5 | 22.9 |
| HA | — | — | — | — | — | 29 | — | — | — |
| OA | — | — | — | — | — | — | 20 | — | — |
| EEEA | 29.0 | 39.0 | 5.0 | — | — | — | — | — | 19.3 |
| MTGA | — | — | — | 19.5 | 24 | — | — | — | — |
| ST | 1 | 1 | 1 | 1 | 1 | 1 | 1 | 1 | 1 |
| Cl-VAc | 2.5 | 2.5 | 2.5 | 2.5 | 2.5 | 2.5 | 2.5 | 2.5 | 1.0 |
| Amount of the produced acrylic rubber | 94.4 | 94.1 | 94.6 | 92.4 | 91.5 | 94.1 | 93.7 | 95.0 | 94.5 |

Notes:
HA: n-hexyl acrylate
OA: n-octyl acrylate
MTGA: methoxyethoxyethoxyethyl acrylate Table 5 below shows the copolymerization ratio, Mooney viscosity $ML_{1+4}$ (100° C.), and Tg value of the obtained acrylic rubbers. In Comparative Examples 4 and 5, the $^1$H-NMR peak of MTGA overlaps with that of 2-MEA, and in Comparative Example 6, the $^1$H-NMR peak of HA overlaps with that of n-BA; thus, their determination is not possible. Therefore, the copolymerization ratios are unknown.

TABLE 5

| Copolymerization ratio as measured by $^1$H-NMR | | Comparative Example | | | | | | | | |
|---|---|---|---|---|---|---|---|---|---|---|
| | | 1 | 2 | 3 | 4 | 5 | 6 | 7 | 8 | 9 |
| n-BA | wt. % | 58.6 | 56.3 | 57.7 | — | — | — | 57.1 | 57.4 | 56.7 |
| | mol % | 58.1 | 59.5 | 59.1 | — | — | — | 61.1 | 57.8 | 61.3 |
| 2-MEA | wt. % | 11.3 | 3.2 | 36.8 | — | — | — | 22.5 | 42.6 | 20.8 |
| | mol % | 12.3 | 3.6 | 37.1 | — | — | — | 23.7 | 42.2 | 22.2 |
| HA | wt. % | — | — | — | — | — | — | — | — | — |
| | mol % | — | — | — | — | — | — | — | — | — |
| OA | wt. % | — | — | — | — | — | — | 20.4 | — | — |
| | mol % | — | — | — | — | — | — | 15.2 | — | — |
| EEEA | wt. % | 30.1 | 40.5 | 5.5 | — | — | — | — | — | 22.5 |
| | mol % | 22.7 | 31.7 | 3.8 | — | — | — | — | — | 16.5 |
| MTGA | wt. % | — | — | — | — | — | — | — | — | — |
| | mol % | — | — | — | — | — | — | — | — | — |
| Cl-Vac | wt. % | 1.09 | 1.05 | 1.09 | 1.08 | 1.05 | 1.09 | 1.22 | 1.26 | 0.58 |
| chlorine content | wt. % | 0.32 | 0.31 | 0.32 | 0.32 | 0.31 | 0.32 | 0.36 | 0.37 | 0.17 |
| Mooney viscosity $ML_{1+4}$ (100° C.) | (point) | 21 | 15 | 26 | 28 | 25 | 22 | 23 | 29 | 20 |
| Polymer Tg | (° C.) | −52.5 | −55.1 | −44.2 | −51.1 | −51.0 | −50.0 | −48.6 | −43.0 | −50.1 |

(2) Using the acrylic rubbers obtained in Comparative Examples 1 to 9, vulcanization and measurement of each item were performed in the same manner as in Examples 1 to 6. Table 6 below shows the measurement results.

TABLE 6

| Measurement item | | Comparative Example | | | | | | | | |
|---|---|---|---|---|---|---|---|---|---|---|
| | | 1 | 2 | 3 | 4 | 5 | 6 | 7 | 8 | 9 |
| Normal state physical properties | | | | | | | | | | |
| Hardness | (Duro A) | 61 | 62 | 60 | 64 | 67 | 58 | 61 | 64 | 51 |
| Mo 100 | (MPa) | 8.3 | 7.5 | 8.3 | 9.8 | 6.9 | 4.3 | 7.5 | 8.6 | 3.8 |
| Tensile strength | (MPa) | 11.2 | 9.7 | 12.5 | 11.0 | 9.5 | 10.9 | 12.0 | 13.9 | 10.9 |
| Elongation at break | (%) | 140 | 120 | 150 | 110 | 110 | 210 | 150 | 160 | 210 |
| ΔV100 | (%) | 39.2 | 43.5 | 28.1 | 28.2 | 29.0 | 98.7 | 80.1 | 26.3 | 35.9 |
| TR-10 | (° C.) | −46.9 | −48.8 | −41.4 | −46.1 | −47.7 | −45.5 | −44.1 | −39.5 | −43.1 |
| Compression set | (%) | 37 | 39 | 32 | 33 | 42 | 29 | 30 | 32 | 46 |

The above results indicate the following.
(1) The cold resistance (TR10) of the conventional acrylic rubber can be improved by copolymerizing 8 to 30 wt. % of ethoxyethoxyethyl acrylate [EEEA] (each Example).
(2) When the amount of EEEA is large, the cold resistance is improved; however, the normal state values and the compression set are deteriorated, and the oil swelling resistance increases (Comparative Examples 1 and 2).
(3) When the amount of EEEA is too low, the effect of improving cold resistance is not sufficiently exhibited (Comparative Example 3).
(4) When methoxy triethylene glycol acrylate [MTGA], which is an alkoxy acrylate with a long chain, is used, the cold resistance is improved; however, the normal state physical properties (tensile strength and elongation) are deteriorated (Comparative Examples 4 and 5).
(5) When an alkyl acrylate with a longer chain compared with n-BA is used instead of alkoxy acrylate, the cold resistance is improved; however, the oil swelling resistance significantly increases, which is not practical (Comparative Examples 6 and 7).
(6) When the amount of crosslinkable monomer is too low, the compression set is deteriorated due to the reduction of crosslinking density (Comparative Example 9).

The invention claimed is:

1. An acrylic rubber that is a copolymer in which 1.09 to 1.43 wt. % of vinyl monochloroacetate is copolymerized as a crosslinkable comonomer, wherein 55.7 to 61.2 wt. % of n-butyl acrylate, 12.0-32.6 wt. % of 2-methoxyethyl acrylate and 10.1 to 26.8 wt. % of ethoxyethoxyethyl acrylate are copolymerized in 100 wt. % of comonomers other than the vinyl monochloroacetate.

2. The acrylic rubber according to claim 1, wherein 1.09 to 1.36 wt. % of the vinyl monochloroacetate is copolymerized as the crosslinkable comonomer in the copolymer.

3. The acrylic rubber according to claim 1, wherein 2 wt. % or less of a vinyl monomer or olefin monomer is further copolymerized.

4. The acrylic rubber according to claim 1, wherein the Mooney viscosity $ML_{1+4}$ (100° C.) is 5 to 100.

5. A crosslinkable acrylic rubber composition comprising the acrylic rubber according to claim 1, and a vulcanizing agent that reacts with the vinyl monochloroacetate.

6. The crosslinkable acrylic rubber composition according to claim 5, wherein the vulcanizing agent that reacts with the reactive halogen group is sulfur, a sulfur donator, or a triazine compound.

* * * * *